United States Patent
Sasaki et al.

(10) Patent No.: US 10,464,174 B2
(45) Date of Patent: Nov. 5, 2019

(54) FLUX-CORED WIRE FOR AR—$CO_2$ MIXED GAS SHIELDED ARC WELDING

(71) Applicant: NIPPON STEEL WELDING & ENGINEERING CO., LTD, Tokyo (JP)

(72) Inventors: Kiyohito Sasaki, Tokyo (JP); Rikiya Takayama, Tokyo (JP); Yasuhito Totsuka, Tokyo (JP)

(73) Assignee: NIPPON STEEL WELDING & ENGINEERING CO., LTD., Tokyo (JP)

(*) Notice: Subject to any disclaimer, the term of this patent is extended or adjusted under 35 U.S.C. 154(b) by 333 days.

(21) Appl. No.: 15/352,267

(22) Filed: Nov. 15, 2016

(65) Prior Publication Data
US 2017/0144257 A1 May 25, 2017

(30) Foreign Application Priority Data

Nov. 25, 2015 (JP) .................... 2015-229437

(51) Int. Cl.
*B23K 35/30* (2006.01)
*B23K 35/36* (2006.01)
(Continued)

(52) U.S. Cl.
CPC ............ *B23K 35/0266* (2013.01); *B23K 9/02* (2013.01); *B23K 9/173* (2013.01); *B23K 9/23* (2013.01);
(Continued)

(58) Field of Classification Search
CPC .............. B23K 35/368; B23K 35/0266; B23K 35/3608; B23K 35/0261; B23K 35/362
See application file for complete search history.

(56) References Cited

U.S. PATENT DOCUMENTS 3,162,751 A 12/1964 Lawrence
3,177,340 A 4/1965 Georges
(Continued)

FOREIGN PATENT DOCUMENTS

JP 09262693 A 10/1997
JP 09277087 A 10/1997
(Continued)

OTHER PUBLICATIONS

Related U.S. Appl. No. 14/993,844; First Named Inventor: Rikiya Takayama Title: "Flux-Cored Wire for Ar—CO2 Mixed Gas Shielded Arc Welding"; Filed: Jan. 12, 2016.
(Continued)

*Primary Examiner* — Dana Ross
*Assistant Examiner* — Lawrence H Samuels
(74) *Attorney, Agent, or Firm* — Holtz, Holtz & Volek PC

(57) ABSTRACT

A wire includes, in terms of % by mass with respect to a total mass of the wire, as a total in a steel outer skin and a flux, 0.03 to 0.09% of C, 0.1 to 0.6% of Si, 1.3 to 2.6% of Mn, 0.01 to 0.5% of Cu, 0.05 to 0.5% of Ti, 0.002 to 0.015% of B, and 0.05% or less of Al, and further including, in the flux, 5 to 9% in terms of $TiO_2$, 0.1 to 0.6% of in terms of $SiO_2$, 0.02 to 0.3% in terms of $Al_2O_3$, 0.1 to 0.8% of Mg, 0.05 to 0.3% in terms of F, 0.05 to 0.3% in terms of Na and K in a fluorine compound, 0.05 to 0.2% of $Na_2O$ and $K_2O$, and 0.1% or less in terms of $ZrO_2$.

4 Claims, 1 Drawing Sheet

(51) Int. Cl.

| | | |
|---|---|---|
| *B23K 35/02* | (2006.01) | |
| *B23K 9/173* | (2006.01) | |
| *B23K 35/38* | (2006.01) | |
| *B23K 35/362* | (2006.01) | |
| *B23K 9/02* | (2006.01) | |
| *B23K 9/23* | (2006.01) | |
| *B23K 33/00* | (2006.01) | |
| *B23K 103/04* | (2006.01) | |

(52) U.S. Cl.
CPC ........ *B23K 33/004* (2013.01); *B23K 35/3073* (2013.01); *B23K 35/362* (2013.01); *B23K 35/3602* (2013.01); *B23K 35/38* (2013.01); *B23K 2103/04* (2018.08)

(56) References Cited

U.S. PATENT DOCUMENTS

| | | | |
|---|---|---|---|
| 3,843,867 A | 10/1974 | Helton et al. | |
| 4,510,374 A | 4/1985 | Kobayashi et al. | |
| 4,750,948 A | 6/1988 | Consaul et al. | |
| 5,099,103 A | 3/1992 | Yamada et al. | |
| 5,104,748 A | 4/1992 | Mori et al. | |
| 5,124,529 A * | 6/1992 | Nishikawa | B23K 35/308 219/146.22 |
| 5,219,425 A | 6/1993 | Nishikawa et al. | |
| 5,580,475 A * | 12/1996 | Sakai | B23K 35/0266 219/145.22 |
| 5,903,814 A | 5/1999 | Miur et al. | |
| 6,124,569 A | 9/2000 | Bonnet et al. | |
| 6,140,607 A | 10/2000 | Kamada et al. | |
| 6,367,686 B1 | 4/2002 | Abriles et al. | |
| 6,733,598 B2 | 5/2004 | Swidersky et al. | |
| 6,830,632 B1 | 12/2004 | Fuerstenau et al. | |
| 6,833,530 B2 | 12/2004 | Kim | |
| 7,170,032 B2 | 1/2007 | Flood | |
| 7,491,910 B2 | 2/2009 | Kapoor et al. | |
| 8,153,935 B2 | 4/2012 | Jang et al. | |
| 8,753,455 B2 | 6/2014 | Jossick et al. | |
| 9,770,789 B2 | 9/2017 | Saruwatari et al. | |
| 10,300,565 B2 | 5/2019 | Barhorst et al. | |
| 2002/0003135 A1 * | 1/2002 | Goto | B23K 35/0266 219/145.22 |
| 2002/0153364 A1 * | 10/2002 | North | B23K 35/368 219/137 WM |
| 2003/0094444 A1 | 5/2003 | Kato et al. | |
| 2004/0020912 A1 | 2/2004 | Hara et al. | |
| 2005/0129855 A1 | 6/2005 | Kamata et al. | |
| 2005/0257853 A1 * | 11/2005 | Yamashita | B23K 35/0255 148/26 |
| 2006/0054079 A1 | 3/2006 | Withey et al. | |
| 2006/0219684 A1 * | 10/2006 | Katiyar | B23K 35/3607 219/145.22 |
| 2007/0051702 A1 * | 3/2007 | James | B23K 9/186 219/73 |
| 2007/0181550 A1 | 8/2007 | Segletes et al. | |
| 2007/0251602 A1 | 11/2007 | Gagnon et al. | |
| 2008/0057341 A1 | 3/2008 | Bouillot et al. | |
| 2011/0057358 A1 | 3/2011 | Mostajeran et al. | |
| 2011/0073570 A1 * | 3/2011 | Shimura | B23K 9/173 219/74 |
| 2012/0055903 A1 * | 3/2012 | Izutani | B23K 9/04 219/74 |
| 2012/0181255 A1 | 7/2012 | Bruck | |
| 2012/0234814 A1 | 9/2012 | Tseng | |
| 2012/0241432 A1 | 9/2012 | Lin et al. | |
| 2012/0241433 A1 | 9/2012 | Kojima et al. | |
| 2012/0267347 A1 | 10/2012 | Arjakine et al. | |
| 2012/0325786 A1 | 12/2012 | Tolling et al. | |
| 2013/0140278 A1 | 6/2013 | Bruck et al. | |
| 2013/0294819 A1 | 11/2013 | Menon et al. | |
| 2013/0313240 A1 * | 11/2013 | Amata | B23K 35/36 219/137.2 |
| 2014/0061179 A1 | 3/2014 | Barhorst et al. | |
| 2014/0097168 A1 | 4/2014 | Ferree et al. | |
| 2014/0349136 A1 | 11/2014 | Barhorst et al. | |
| 2014/0353288 A1 | 12/2014 | Amata et al. | |
| 2015/0114944 A1 * | 4/2015 | Fukuda | B23K 35/3607 219/145.22 |
| 2015/0117937 A1 * | 4/2015 | Nakamura | B23K 35/368 403/272 |
| 2015/0360327 A1 * | 12/2015 | Nakamura | B23K 35/3053 403/272 |
| 2017/0165793 A1 | 6/2017 | Barhorst et al. | |
| 2019/0126409 A1 | 5/2019 | Seo et al. | |

FOREIGN PATENT DOCUMENTS

| | | |
|---|---|---|
| JP | 2002361486 A | 12/2002 |
| JP | 2005319508 A | 11/2005 |
| JP | 2006095550 A | 4/2006 |
| JP | 2008087043 A | 4/2008 |
| JP | 2009061474 A | 3/2009 |
| JP | 2009248137 A | 10/2009 |
| JP | 2013226577 A | 11/2013 |
| JP | 2014113615 A | 6/2014 |
| JP | 2015006635 A | 1/2015 |
| JP | 2015220945 A | 12/2015 |

OTHER PUBLICATIONS

Related U.S. Appl. No. 14/994,947; First Named Inventor: Rikiya Takayama; Title: "Flux-Cored Wire for Carbon Dioxide Gas Shielded Arc Welding"; Filed: Jan. 13, 2016.

Related U.S. Appl. No. 15/099,094; First Named Inventor: Yuki Kayamori; Title: "Flux-Cored Wire for Gas-Shielded Arc Welding"; Filed: Apr. 14, 2016.

Related U.S. Appl. No. 15/299,065; First Named Inventor: Rikiya Takayama; Title: "Flux-Cored Wire for Carbon Dioxide Gas Shielded Arc Welding"; Filed: Oct. 20, 2016.

Japanese Office Action (and English language translation thereof) dated Jul. 24, 2018 issued in Japanese Application No. 2015-229437.

Office Action (Non-Final Rejection) dated Jun. 10, 2019 issued in U.S. Appl. No. 15/299,065.

* cited by examiner

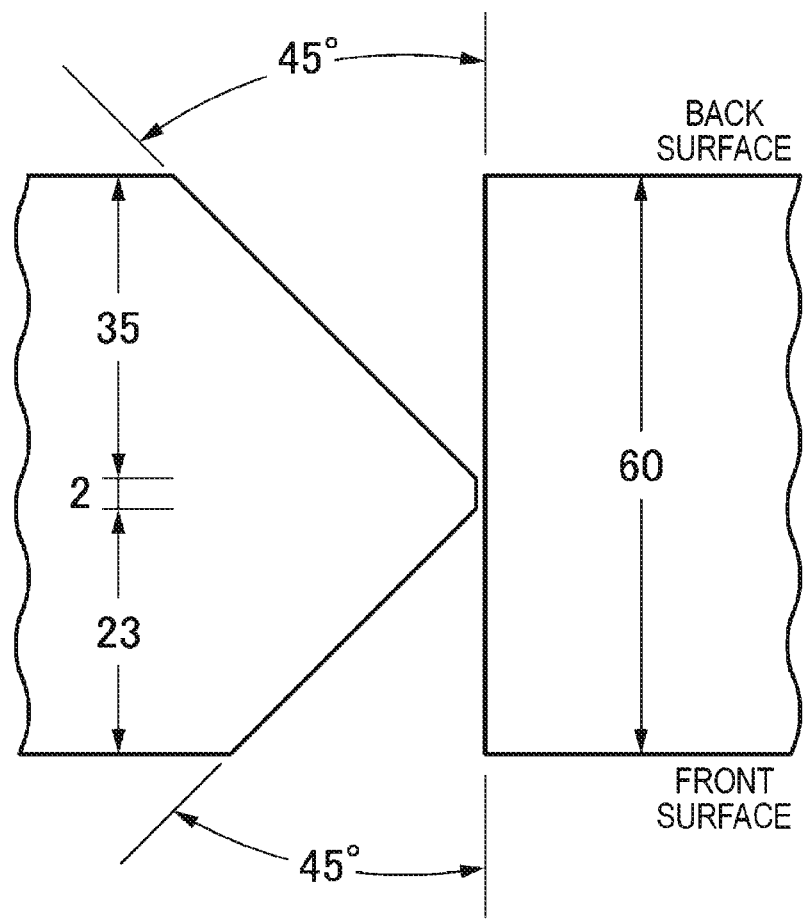

FLUX-CORED WIRE FOR AR—$CO_2$ MIXED GAS SHIELDED ARC WELDING

BACKGROUND

Technical Field

The present invention relates to a flux-cored wire for Ar—$CO_2$ mixed gas shielded arc welding providing excellent welding weldability in all-position welding when steel used for a steel structure or the like is welded, and capable of obtaining a weld metal having an excellent characteristic such as excellent low-temperature cracking resistance, low-temperature toughness, or fracture toughness (hereinafter, referred to as CTOD).

Related Art

As a flux-cored wire used for gas shielded arc welding using steel as a material to be welded, for example, a rutile type flux-cored wire or a basic flux-cored wire is known. Welding using the basic flux-cored wire can reduce the amount of oxygen in a weld metal, and therefore the weld metal has excellent low-temperature toughness and CTOD characteristics. However, welding using the basic flux-cored wire has poorer welding weldability in all-position welding than welding using the rutile type flux-cored wire, and therefore is not often used generally.

On the other hand, gas shielded arc welding using the rutile type flux-cored wire provides an extremely excellent welding efficiency and an extremely excellent welding weldability in all-position welding, and therefore is applied in a wide range of fields such as shipbuilding, bridges, oceanic structures, and steel frames.

However, the rutile type flux-cored wire is obtained by filling a flux mainly including a metal oxide such as $TiO_2$ into a steel outer skin, and therefore a weld metal has a large amount of oxygen and does not easily obtain low-temperature toughness.

In addition, in these flux-cored wires, the amount of diffusion hydrogen is larger than that in a solid wire due to moisture included in a raw material of the flux or moisture absorption while the wire is stored. Therefore, there is a risk of low-temperature cracking of a weld metal. It is necessary to perform preheating at about 100° C. when a thick steel plate is welded. This reduces a welding efficiency.

Various developments have been performed for a rutile type flux-cored wire of low-temperature steel. For example, JP 2009-61474 A discloses a technology for obtaining a weld metal having excellent low-temperature toughness by reducing the amount of oxygen in the weld metal while the amount of a slag acting on welding weldability is maintained by adding an alloy component which changes into a slag component during welding. However, in the technology described in JP 2009-61474 A, a shielding gas is $CO_2$, and therefore the amount of oxygen in the weld metal increases, sufficient low-temperature toughness or a sufficient CTOD value cannot be obtained, and low-temperature cracking resistance is not taken into account although high-temperature cracking resistance is secured.

JP 2008-87043 A also discloses a technology for obtaining a weld metal having excellent low-temperature toughness. However, MgO added for reducing the amount of oxygen in a weld metal makes an arc unstable during welding, generates a large amount of spatter, and makes welding weldability poor. In the technology disclosed in JP 2008-87043 A, low-temperature cracking resistance is not particularly taken into account.

JP 2009-248137 A discloses a rutile type flux-cored wire providing excellent weldability in all-position welding, and capable of obtaining a weld metal having excellent low-temperature toughness. However, the technology disclosed in JP 2009-248137 A does not examine stabilization of the low-temperature toughness sufficiently, and therefore has such a problem that an excellent CTOD value cannot be obtained.

JP 9-277087 A discloses a technology for obtaining excellent low-temperature toughness both in welding and in a heat treatment after welding by limiting contents of Nb, V, and P in a wire. However, the technology described in JP 9-277087 A also has such a problem that weldability in all-position welding or a CTOD value is not sufficient.

SUMMARY

Therefore, the present invention has been achieved in view of the above-described problems. An object of the present invention is to provide a flux-cored wire for Ar—$CO_2$ mixed gas shielded arc welding providing excellent welding weldability in all-position welding when steel used for a steel structure or the like is welded, and capable of obtaining a weld metal having excellent low-temperature cracking resistance, low-temperature toughness, and CTOD characteristics.

The present inventors have variously studied a rutile type flux-cored wire for gas shielded arc welding using an Ar—$CO_2$ mixed gas as a shielding gas in order to obtain a weld metal providing excellent welding weldability in all-position welding, and having stable low-temperature toughness at −40° C., an excellent CTOD value at −10° C., and excellent low-temperature cracking resistance.

As a result, the present inventors have found that it is possible to obtain a weld metal providing excellent welding weldability in all-position welding and having excellent low-temperature toughness and CTOD value by forming the wire of a metal oxide mainly containing $TiO_2$, a slag component formed of a fluorine compound containing Na and K, an optimum alloy component, and a chemical component containing a deoxidizer. In addition, the present inventors have found that it is possible to improve low-temperature cracking resistance also in a weld metal having relatively high strength by eliminating a seam in a molded steel outer skin by welding a joint of the steel outer skin.

That is, an abstract of the present invention is characterized by a flux-cored wire for Ar—$CO_2$ mixed gas shielded arc welding obtained by filling a flux into a steel outer skin, including, in terms of % by mass with respect to a total mass of the wire, as a total in the steel outer skin and the flux, 0.03 to 0.09% of C, 0.1 to 0.6% of Si, 1.3 to 2.6% of Mn, 0.01 to 0.5% of Cu, 0.05 to 0.5% of Ti, 0.002 to 0.015% of B, and 0.05% or less of Al, and further including, in terms of % by mass with respect to the total mass of the wire, in the flux, 5 to 9% of a Ti oxide in terms of $TiO_2$ in total, 0.1 to 0.6% of a Si oxide in terms of $SiO_2$ in total, 0.02 to 0.3% of an Al oxide in terms of $Al_2O_3$ in total, 0.1 to 0.8% of Mg, 0.05 to 0.3% of a fluorine compound in terms of F in total, 0.05 to 0.3% of one kind or two kinds of Na and K in the fluorine compound in terms of Na and K in total, 0.05 to 0.2% of one kind or two kinds of $Na_2O$ and $K_2O$ in total, and 0.1% or less of a Zr oxide in terms of $ZrO_2$ in total, the balance being Fe in the steel outer skin, iron powder, a Fe component of iron alloy powder, and inevitable impurities.

In addition, the present invention is characterized by further including 0.1 to 0.5% of Ni, in terms of % by mass with respect to a total mass of the wire, as a total in the steel outer skin and the flux.

In addition, the present invention is characterized by eliminating a seam in a molded steel outer skin by welding a joint of the steel outer skin.

According to the flux-cored wire for Ar—$CO_2$ mixed gas shielded arc welding of the present invention, excellent welding weldability in all-position welding is obtained, and a weld metal having excellent low-temperature toughness at −40° C., an excellent CTOD value at −10° C., and excellent low-temperature cracking resistance is obtained. Therefore, according to the present invention, it is possible to improve a welding efficiency and a quality of a weld.

BRIEF DESCRIPTION OF DRAWING

FIG. 1 illustrates a groove shape in a joint test used in Examples of the present invention.

DETAILED DESCRIPTION

Hereinafter, compositions of components of a flux-cored wire for Ar—$CO_2$ mixed gas shielded arc welding according to an embodiment of the present invention, contents thereof, and a reason for limiting the compositions will be described. The content of each component will be represented by % by mass with respect to a total mass of the wire. The % by mass will be represented simply by %.

[C: 0.03 to 0.09% as a Total in Steel Outer Skin and Flux]

C contributes to stabilizing an arc during welding and improves strength of a weld metal. However, when a content of C is less than 0.03%, the arc cannot be stabilized, and desired strength of the weld metal cannot be obtained sufficiently. On the other, when the content of C is more than 0.09%, C remains in the weld metal excessively, and therefore the strength of the weld metal is too high, and low-temperature toughness thereof is reduced. Therefore, the content of C is set to be from 0.03 to 0.09% as a total in the steel outer skin and the flux. C can be added from metal powder, alloy powder, or the like in the flux in addition to a component included in the steel outer skin.

[Si: 0.1 to 0.6% as a Total in Steel Outer Skin and Flux]

Si partly becomes a weld slag during welding, thereby improves an appearance of a weld bead or a shape thereof, and contributes to improving welding weldability. However, when a content of Si is less than 0.1%, the appearance of the weld bead or the shape thereof cannot be improved sufficiently. On the other, when the content of Si is more than 0.6%, Si remains in a weld metal excessively, and thereby reduces low-temperature toughness of the weld metal. Therefore, the content of Si is set to be from 0.1 to 0.6% as a total in the steel outer skin and the flux. Si can be added from metal Si or alloy powder such as Fe—Si or Fe—Si—Mn in the flux in addition to a component included in the steel outer skin.

[Mn: 1.3 to 2.6% as a Total in Steel Outer Skin and Flux]

Mn remains in a weld metal, and thereby increases strength of the weld metal, low-temperature toughness thereof, and a CTOD value thereof. However, when a content of Mn is less than 1.3%, desired strength of the weld metal cannot be obtained, and sufficient low-temperature toughness thereof or a sufficient CTOD value thereof cannot be obtained. On the other hand, when the content of Mn is more than 2.6%, Mn remains in the weld metal excessively, the strength of the weld metal becomes too high, and therefore low-temperature toughness of the weld metal and a CTOD value thereof are reduced. Therefore, the content of Mn is set to be from 1.3 to 2.6% as a total in the steel outer skin and the flux. Mn can be added from metal Mn or alloy powder such as Fe—Mn or Fe—Si—Mn in the flux in addition to a component included in the steel outer skin.

[Cu: 0.01 to 0.5% as a Total in Steel Outer Skin and Flux]

Cu makes a structure of a weld metal fine and increases low-temperature toughness thereof and strength thereof. However, when a content of Cu is less than 0.01%, sufficient low-temperature toughness of the weld metal or sufficient strength thereof cannot be obtained. On the other hand, when the content of Cu is more than 0.5%, high-temperature cracking easily occurs in the weld metal. Therefore, the content of Cu is set to be from 0.01 to 0.5% as a total in the steel outer skin and the flux. Cu can be added from metal Cu or alloy powder such as Cu—Zr or Fe—Si—Cu in the flux in addition to a Cu plating component formed on a surface of the steel outer skin.

[Ti: 0.05 to 0.5% as a Total in Steel Outer Skin and Flux]

Ti makes a structure of a weld metal fine and improves low-temperature toughness thereof and a CTOD value thereof. However, when a content of Ti is less than 0.05%, low-temperature toughness of a weld metal or a CTOD value thereof cannot be improved sufficiently. On the other, when the content of Ti is more than 0.5%, an upper bainite structure hindering toughness is occurred, and the low-temperature toughness and the CTOD value are reduced. Therefore, the content of Ti is set to be from 0.05 to 0.5% as a total in the steel outer skin and the flux. Ti can be added from metal Ti or alloy powder such as Fe—Ti in the flux in addition to a component included in the steel outer skin.

[B: 0.002 to 0.015% as a Total in Steel Outer Skin and Flux]

A small amount of B added makes a microstructure of a weld metal fine and improves low-temperature toughness of the weld metal and a CTOD value thereof. However, when a content of B is less than 0.002%, the low-temperature toughness of the weld metal or the CTOD value thereof cannot be improved sufficiently. On the other, when the content of B is more than 0.015%, the low-temperature toughness of the weld metal and the CTOD value thereof are reduced, and high-temperature cracking is easily occurred in the weld metal. Therefore, the content of B is set to be from 0.002 to 0.015%. B can be added from metal B, alloy powder such as Fe—B or Fe—Mn—B, or borax in the flux in addition to a component included in the steel outer skin.

[Al: 0.05% or Less as a Total in Steel Outer Skin and Flux]

Al remains in the weld metal as an oxide to reduce the toughness of the weld metal. Particularly when the content of Al is more than 0.05%, toughness of the weld metal is significantly low. Therefore, the content of Al is set to be 0.05% or less. Al is not an essential element but the content thereof may be 0%.

[Total Content of Ti Oxide in Terms of $TiO_2$ in Flux: 5 to 9%]

A Ti oxide contributes to stabilizing an arc during welding, improves a shape of a weld bead, and contributes to improving welding weldability. In addition, in vertical upward welding, the Ti oxide adjusts viscosity of a melted slag or a melting point thereof by being included in a weld slag as a Ti oxide, and prevents a molten metal from dripping. However, when a total content of the Ti oxide in terms of $TiO_2$ is less than 5%, these effects cannot be obtained sufficiently, the arc is unstable, the amount of spatter occurring is large, and the shape of the weld bead is deteriorated. In addition, in vertical upward welding, the molten metal drips easily. On the other, when the total content of the Ti oxide in terms of $TiO_2$ is more than 9%, the arc is stable and the amount of spatter occurring can be less. However, the Ti oxide remains excessively in the weld metal, and low-temperature toughness is thereby reduced. Therefore, the total content of the Ti oxide in terms of $TiO_2$ in the flux is set to be from 5 to 9%. The Ti oxide is added from rutile, titanium oxide, titanium slag, ilmenite, or the like in the flux.

[Total Content of Si Oxide in Terms of $SiO_2$ in Flux: 0.1 to 0.6%]

A Si oxide adjusts viscosity of a melted slag or a melting point thereof to improve a slag encapsulation property. However, when a total content of the Si oxide in terms of $SiO_2$ is less than 0.1%, this effect cannot be obtained sufficiently, and a bead appearance is poor. On the other, when the total content of the Si oxide in terms of $SiO_2$ is more than 0.6%, a basicity of the melted slag is reduced, the amount of oxygen in the weld metal is thereby increased, and low-temperature toughness is reduced. Therefore, the total content of the Si oxide in terms of $SiO_2$ in the flux is set to be from 0.1 to 0.6%. The Si oxide can be added from silica sand, sodium silicate, or the like in the flux.

[Total Content of Al Oxide in Terms of $Al_2O_3$ in Flux: 0.02 to 0.3%]

An Al oxide adjusts viscosity of a melted slag or a melting point thereof during welding to prevent a molten metal from dripping particularly in vertical upward welding. However, when a total content of the Al oxide in terms of $Al_2O_3$ is less than 0.02%, this effect cannot be obtained sufficiently, and the molten metal easily drips in vertical upward welding. On the other, when the total content of the Al oxide in terms of $Al_2O_3$ is more than 0.3%, the Al oxide remains excessively in the weld metal, and low-temperature toughness is thereby reduced. Therefore, the total content of the Al oxide in terms of $Al_2O_3$ in the flux is set to be from 0.02 to 0.3%. The Al oxide can be added from alumina or the like in the flux.

[Mg in flux: 0.1 to 0.8%]

Mg acts as a strong deoxidizer, and thereby reduces oxygen in a weld metal to increase low-temperature toughness of the weld metal and a CTOD value thereof. However, when a content of Mg is less than 0.1%, the low-temperature toughness of the weld metal or the CTOD value thereof cannot be improved sufficiently. On the other, when the content of Mg is more than 0.8%, Mg reacts vigorously with oxygen in an arc during welding to increase the amount of spatter occurring or fume occurring. Therefore, the content of Mg in the flux is set to be from 0.1 to 0.8%. Mg can be added from metal Mg or alloy powder such as Al—Mg in the flux.

[Total Content of Fluorine Compound in Terms of F in Flux: 0.05 to 0.3%]

A fluorine compound stabilizes an arc. However, when a total content of the fluorine compound in terms of F is less than 0.05%, this effect cannot be obtained sufficiently, and the arc is unstable. On the other, when the total content of the fluorine compound in terms of F is more than 0.3%, the arc is unstable to increase the amount of spatter occurring. In addition, when the total content of the fluorine compound in terms of F is more than 0.3%, a molten metal easily drips in vertical upward welding. Therefore, the total content of the fluorine compound in terms of F in the flux is set to be from 0.05 to 0.3%. The fluorine compound can be added from $CaF_2$, NaF, LiF, $MgF_2$, $K_2SiF_6$, $Na_3AlF_6$, $AlF_3$, or the like. The content in terms of F is a total content of F included therein.

[Total Content of One Kind or Two Kinds of Na and K in Terms of Na and K in Fluorine Compound in Flux: 0.05 to 0.3%]

Na and K in the fluorine compound further reduce oxygen in a weld metal (such a reduction in oxygen cannot be performed only by Mg), and increase low-temperature toughness of a weld metal and a CTOD value thereof. However, when a total content of one kind or two kinds of Na and K in terms of Na and K in the fluorine compound is less than 0.05%, the low-temperature toughness of the weld metal or the CTOD value thereof cannot be increased sufficiently. On the other, when the total content of one kind or two kinds of Na and K in terms of Na and K in the fluorine compound is more than 0.3%, an arc is rough, and the amount of spatter occurring is large. Therefore, the total content of one kind or two kinds of Na and K in terms of Na and K in the fluorine compound in the flux is set to be from 0.05 to 0.3%. Na and K in the fluorine compound can be added from NaF, $K_2SiF_6$, $Na_3AlF_6$, or the like. The content in terms of Na or K is a total content of Na or K included therein.

[Total Content of One Kind or Two Kinds of $Na_2O$ and $K_2O$ in Flux: 0.05 to 0.2%]

$Na_2O$ and $K_2O$ act as an arc stabilizer and a slag forming agent. When a total content of one kind or two kinds of $Na_2O$ and $K_2O$ is less than 0.05%, an arc is unstable, and the amount of spatter occurring is large. In addition, a bead appearance is poor. On the other, when the total content of one kind or two kinds of $Na_2O$ and $K_2O$ is more than 0.2%, slag removability is poor, and metal drips easily in vertical upward welding. Therefore, the total content of one kind or two kinds of $Na_2O$ and $K_2O$ in the flux is set to be from 0.05 to 0.2%. $Na_2O$ and $K_2O$ can be added from a solid component of water glass including sodium silicate and potassium silicate, calcium titanate, sodium titanate, or the like.

[Total Content of Zr Oxide in Terms of $ZrO_2$ in Flux: 0.1% or Less]

A small amount of the Zr oxide may be included in a Ti oxide. However, the Zr oxide deteriorates slag removability. Particularly when a content thereof is more than 0.1%, the slag removability is significantly poor. Therefore, the total content of the Zr oxide in terms of $ZrO_2$ is set to be 0.1% or less. The Zr oxide is not an essential component but the total content thereof in terms of $ZrO_2$ may be 0%.

[Ni: 0.1 to 0.5% as a Total in Steel Outer Skin and Flux]

Ni further stabilizes low-temperature toughness of a weld metal. When a content of Ni is less than 0.1%, the effect of further stabilizing the low-temperature toughness of the weld metal cannot be obtained sufficiently. On the other, when the content of Ni is more than 0.5%, tensile strength of the weld metal may be too high. Therefore, the content of Ni is set to be from 0.1 to 0.5% as a total in the steel outer skin and the flux. Ni can be added from metal Ni or alloy powder such as Fe—Ni in the flux in addition to a component included in the steel outer skin. Ni is not an essential element but the content thereof may be 0%.

[No Seam in Steel Outer Skin]

The flux-cored wire for Ar—$CO_2$ mixed gas shielded arc welding according to an embodiment of the present invention has a structure obtained by molding a steel outer skin into a pipe-like shape and filling a flux thereinto. The kind of the wire is roughly classified into a wire having no seam in a molded steel outer skin obtained by welding a joint of the steel outer skin, and a wire having a seam in a steel outer skin without welding a joint of the steel outer skin. In an embodiment of the present invention, a wire having any cross sectional structure can be employed. However, a wire having no seam in a steel outer skin is more preferable because the wire having no seam in the steel outer skin can be subjected to a heat treatment for reducing the total amount of hydrogen in the wire, a flux after manufacturing does not absorb moisture, and therefore it is possible to reduce the amount of diffusion hydrogen in a weld metal and to improve low-temperature cracking resistance.

The balance of the flux-cored wire for Ar—$CO_2$ mixed gas shielded arc welding to which an embodiment of the present invention is applied is Fe in the steel outer skin, iron powder added for adjusting components, a Fe component of iron alloy powder such as a Fe—Mn alloy or a Fe—Si alloy, and inevitable impurities. A flux filling ratio is not particularly limited, but is preferably from 8 to 20% with respect to the total mass of the wire from a viewpoint of productivity.

The shielding gas during welding is a mixed gas of Ar-5 to 25% $CO_2$ for reducing the amount of oxygen in the weld metal.

Examples

Hereinafter, effects of an embodiment of the present invention will be described specifically with Examples.

By using JIS G 3141 SPCC for a steel outer skin, the steel outer skin was molded into a U shape in a step of molding the steel outer skin. Thereafter, a wire having no seam obtained by welding a joint of the steel outer skin and a wire having a gap without welding were formed into pipes and were stretched to experimentally manufacture flux-cored wires containing various components and each having a wire diameter of 1.2 mm, indicated in Tables 1 to 4.

TABLE 1

| | | wire component (% by mass) | | | | | | | | | | | |
|---|---|---|---|---|---|---|---|---|---|---|---|---|---|
| | | total in steel outer skin and flux | | | | | | | | in flux | | | |
| | | | | | | | | | | in terms of $TiO_2$ | in terms of $SiO_2$ | in terms of $Al_2O_3$ | | * in terms of F |
| category | wire symbol | C | Si | Mn | Cu | Ti | B | Al | Ni | | | | Mg | |
| Examples of the present invention | W1 | 0.05 | 0.33 | 2.11 | 0.22 | 0.19 | 0.0065 | 0.02 | — | 5.77 | 0.21 | 0.04 | 0.31 | 0.12 |
| | W2 | 0.06 | 0.52 | 1.38 | 0.09 | 0.27 | 0.0102 | — | 0.4 | 8.05 | 0.48 | 0.17 | 0.56 | 0.21 |
| | W3 | 0.07 | 0.12 | 1.72 | 0.31 | 0.09 | 0.0091 | 0.01 | 0.18 | 5.51 | 0.16 | 0.22 | 0.46 | 0.11 |
| | W4 | 0.05 | 0.12 | 2.27 | 0.21 | 0.07 | 0.0106 | 0.03 | — | 7.15 | 0.44 | 0.15 | 0.55 | 0.28 |
| | W5 | 0.04 | 0.32 | 2.04 | 0.04 | 0.22 | 0.0072 | — | 0.44 | 6.95 | 0.37 | 0.23 | 0.12 | 0.12 |
| | W6 | 0.03 | 0.51 | 2.17 | 0.36 | 0.12 | 0.0097 | 0.02 | — | 5.77 | 0.17 | 0.09 | 0.77 | 0.21 |
| | W7 | 0.04 | 0.57 | 1.86 | 0.45 | 0.35 | 0.0035 | 0.01 | 0.32 | 7.34 | 0.22 | 0.14 | 0.42 | 0.19 |
| | W8 | 0.05 | 0.41 | 1.89 | 0.24 | 0.24 | 0.0113 | 0.03 | 0.22 | 5.02 | 0.57 | 0.25 | 0.57 | 0.07 |
| | W9 | 0.06 | 0.28 | 1.94 | 0.09 | 0.09 | 0.0046 | 0.01 | — | 6.99 | 0.29 | 0.17 | 0.35 | 0.24 |
| | W10 | 0.04 | 0.32 | 2.52 | 0.23 | 0.15 | 0.0078 | — | 0.33 | 7.62 | 0.24 | 0.21 | 0.14 | 0.14 |
| | W11 | 0.04 | 0.29 | 1.81 | 0.11 | 0.45 | 0.0142 | 0.04 | — | 8.19 | 0.38 | 0.13 | 0.57 | 0.15 |
| | W12 | 0.06 | 0.38 | 2.01 | 0.08 | 0.12 | 0.0107 | 0.02 | 0.29 | 5.72 | 0.41 | 0.28 | 0.38 | 0.24 |
| | W13 | 0.06 | 0.44 | 1.66 | 0.28 | 0.19 | 0.0072 | 0.03 | 0.12 | 5.77 | 0.33 | 0.29 | 0.27 | 0.19 |
| | W14 | 0.05 | 0.27 | 2.34 | 0.18 | 0.23 | 0.0028 | 0.02 | 0.37 | 6.91 | 0.25 | 0.08 | 0.43 | 0.16 |
| | W15 | 0.08 | 0.15 | 2.08 | 0.26 | 0.06 | 0.0065 | 0.03 | — | 7.04 | 0.41 | 0.17 | 0.51 | 0.07 |

*: As the fluorine compound, one or more kinds of $CaF_2$, $AlF_3$, NaF, $K_2SiF_6$, $K_2ZrF_6$, and $Na_3AlF_6$ were used.

TABLE 2

| | | wire component (% by mass) | | | | | | | | |
|---|---|---|---|---|---|---|---|---|---|---|
| | | in flux | | | | | | | | |
| | | ** Na and K in fluorine compound | | | | | total content of $Na_2O$ and $K_2O$ | in terms of $ZrO_2$ | *** others | wire seam |
| category | wire symbol | in terms of Na | in terms of K | total content in terms of Na and K | $Na_2O$ | $K_2O$ | | | | |
| Examples of the present invention | W1 | 0.11 | — | 0.11 | 0.04 | 0.08 | 0.12 | 0.05 | balance | seamed |
| | W2 | 0.14 | 0.07 | 0.21 | — | 0.08 | 0.08 | 0.09 | balance | seamed |
| | W3 | — | 0.09 | 0.09 | 0.07 | 0.05 | 0.12 | — | balance | seamed |
| | W4 | 0.19 | 0.09 | 0.28 | 0.09 | — | 0.09 | 0.04 | balance | seamless |
| | W5 | 0.06 | 0.07 | 0.13 | — | 0.06 | 0.06 | 0.07 | balance | seamed |
| | W6 | 0.12 | 0.08 | 0.20 | 0.11 | 0.05 | 0.16 | 0.05 | balance | seamed |
| | W7 | 0.13 | 0.05 | 0.18 | 0.11 | — | 0.11 | 0.05 | balance | seamed |
| | W8 | 0.06 | — | 0.06 | 0.08 | 0.05 | 0.13 | 0.02 | balance | seamed |
| | W9 | 0.11 | 0.12 | 0.23 | 0.07 | 0.05 | 0.12 | — | balance | seamed |
| | W10 | 0.08 | 0.07 | 0.15 | 0.09 | 0.06 | 0.15 | 0.05 | balance | seamless |
| | W11 | 0.07 | 0.04 | 0.12 | 0.06 | 0.11 | 0.17 | 0.04 | balance | seamed |

TABLE 2-continued wire component (% by mass) — in flux

| category | wire symbol |  Na and K in fluorine compound | | | Na$_2$O | K$_2$O | total content of Na$_2$O and K$_2$O | in terms of ZrO$_2$ | * others | wire seam |
| | | in terms of Na | in terms of K | total content in terms of Na and K | | | | | | |
| --- | --- | --- | --- | --- | --- | --- | --- | --- | --- | --- |
| | W12 | 0.18 | 0.05 | 0.23 | 0.09 | — | 0.09 | 0.04 | balance | seamless |
| | W13 | 0.09 | 0.08 | 0.17 | 0.05 | 0.09 | 0.14 | 0.03 | balance | seamed |
| | W14 | — | 0.15 | 0.15 | 0.04 | 0.13 | 0.17 | — | balance | seamed |
| | W15 | 0.08 | — | 0.08 | — | 0.11 | 0.11 | 0.03 | balance | seamed |

**: As Na and K in fluorine compound, one or more kinds of NaF, K$_2$SiF$_6$, K$_2$ZrF$_6$, and Na$_3$AlF$_6$ were used.
***: Others were Fe in steel outer skin, iron powder, a Fe component of an iron alloy, and inevitable impurities.

TABLE 3 wire component (% by mass)

| category | wire symbol | total in steel outer skin and flux | | | | | | | | in flux | | | | * in terms of F |
| | | C | Si | Mn | Cu | Ti | B | Al | Ni | in terms of TiO$_2$ | in terms of SiO$_2$ | in terms of Al$_2$O$_3$ | Mg | |
| --- | --- | --- | --- | --- | --- | --- | --- | --- | --- | --- | --- | --- | --- | --- |
| Comparative Examples | W16 | 0.02 | 0.23 | 1.45 | 0.28 | 0.22 | 0.0081 | 0.03 | — | 5.99 | 0.34 | 0.13 | 0.15 | 0.07 |
| | W17 | 0.10 | 0.55 | 2.55 | 0.22 | 0.31 | 0.0051 | 0.02 | — | 5.51 | 0.28 | 0.11 | 0.47 | 0.27 |
| | W18 | 0.05 | 0.04 | 1.45 | 0.33 | 0.22 | 0.0041 | — | 0.38 | 6.05 | 0.31 | 0.22 | 0.04 | 0.12 |
| | W19 | 0.04 | 0.65 | 1.94 | 0.29 | 0.25 | 0.0105 | 0.04 | 0.29 | 5.88 | 0.52 | 0.18 | 0.66 | 0.21 |
| | W20 | 0.05 | 0.44 | 1.15 | 0.28 | 0.09 | 0.0082 | 0.03 | 0.37 | 5.94 | 0.51 | 0.16 | 0.69 | 0.25 |
| | W21 | 0.06 | 0.51 | 2.68 | 0.20 | 0.44 | 0.0078 | 0.03 | — | 5.57 | 0.32 | 0.11 | 0.41 | 0.15 |
| | W22 | 0.04 | 0.35 | 1.44 | 0.004 | 0.24 | 0.0067 | 0.05 | 0.005 | 6.67 | 0.46 | 0.21 | 0.46 | 0.18 |
| | W23 | 0.04 | 0.54 | 1.99 | 0.57 | 0.31 | 0.0087 | 0.01 | 0.13 | 5.17 | 0.34 | 0.11 | 0.71 | 0.36 |
| | W24 | 0.04 | 0.56 | 2.41 | 0.31 | 0.01 | 0.0097 | 0.05 | 0.18 | 5.54 | 0.21 | 0.13 | 0.88 | 0.16 |
| | W25 | 0.03 | 0.28 | 1.63 | 0.22 | 0.58 | 0.0033 | 0.01 | 0.14 | 8.25 | 0.54 | 0.01 | 0.35 | 0.21 |
| | W26 | 0.05 | 0.42 | 1.75 | 0.22 | 0.38 | 0.0014 | 0.03 | 0.15 | 5.87 | 0.04 | 0.27 | 0.51 | 0.17 |
| | W27 | 0.03 | 0.42 | 2.12 | 0.09 | 0.23 | 0.0166 | 0.02 | 0.33 | 4.03 | 0.43 | 0.09 | 0.55 | 0.19 |
| | W28 | 0.06 | 0.33 | 2.37 | 0.15 | 0.19 | 0.0067 | 0.09 | 0.61 | 5.23 | 0.37 | 0.17 | 0.64 | 0.16 |
| | W29 | 0.05 | 0.45 | 2.36 | 0.28 | 0.09 | 0.0049 | 0.03 | — | 9.58 | 0.23 | 0.09 | 0.45 | 0.02 |
| | W30 | 0.06 | 0.28 | 2.24 | 0.11 | 0.16 | 0.0079 | 0.02 | 0.35 | 6.25 | 0.27 | 0.36 | 0.27 | 0.09 |

*: As the fluorine compound, one or more kinds of CaF$_2$, AlF$_3$, NaF, K$_2$SiF$_6$, K$_2$ZrF$_6$, and Na$_3$AlF$_6$ were used.

TABLE 4 wire component (% by mass) — in flux

| category | wire symbol |  Na and K in fluorine compound | | | Na$_2$O | K$_2$O | total content of Na$_2$O and K$_2$O | in terms of ZrO$_2$ | * others | wire seam |
| | | in terms of Na | in terms of K | total content in terms of Na and K | | | | | | |
| --- | --- | --- | --- | --- | --- | --- | --- | --- | --- | --- |
| Comparative Examples | W16 | 0.02 | — | 0.02 | 0.07 | — | 0.07 | 0.09 | balance | seamless |
| | W17 | 0.24 | 0.12 | 0.36 | — | 0.08 | 0.08 | 0.06 | balance | seamed |
| | W18 | — | 0.09 | 0.09 | 0.05 | 0.08 | 0.13 | 0.07 | balance | seamless |
| | W19 | 0.19 | — | 0.19 | 0.08 | 0.09 | 0.17 | 0.15 | balance | seamless |
| | W20 | 0.21 | — | 0.21 | 0.15 | 0.13 | 0.28 | 0.02 | balance | seamed |
| | W21 | 0.09 | 0.08 | 0.17 | 0.03 | — | 0.03 | 0.04 | balance | seamed |
| | W22 | 0.12 | 0.02 | 0.14 | — | 0.08 | 0.08 | — | balance | seamed |
| | W23 | 0.15 | 0.14 | 0.29 | 0.05 | 0.08 | 0.13 | 0.08 | balance | seamless |
| | W24 | — | 0.13 | 0.13 | 0.08 | 0.06 | 0.14 | 0.05 | balance | seamless |

TABLE 4-continued

| | | wire component (% by mass) | | | | | | | | |
|---|---|---|---|---|---|---|---|---|---|---|
| | | in flux | | | | | | | | |
| | | ** Na and K in fluorine compound | | | | | total content of Na$_2$O and K$_2$O | in terms of ZrO$_2$ | *** others | wire seam |
| category | wire symbol | in terms of Na | in terms of K | total content in terms of Na and K | Na$_2$O | K$_2$O | | | | |
| | W25 | 0.09 | 0.11 | 0.20 | 0.03 | 0.05 | 0.08 | 0.07 | balance | seamless |
| | W26 | 0.11 | 0.07 | 0.18 | 0.07 | 0.07 | 0.14 | 0.04 | balance | seamless |
| | W27 | 0.12 | 0.02 | 0.14 | — | 0.16 | 0.16 | 0.08 | balance | seamless |
| | W28 | 0.06 | 0.11 | 0.17 | 0.15 | — | 0.15 | 0.05 | balance | seamed |
| | W29 | 0.06 | — | 0.06 | 0.08 | 0.08 | 0.16 | — | balance | seamless |
| | W30 | 0.09 | — | 0.09 | 0.04 | 0.07 | 0.11 | 0.04 | balance | seamless |

**: As Na and K in fluorine compound, one or more kinds of NaF, K$_2$SiF$_6$, K$_2$ZrF$_6$, and Na$_3$AlF$_6$ were used.
***: Others were Fe in steel outer skin, iron powder, a Fe component of an iron alloy, and inevitable impurities.

For the experimentally manufactured wires, welding weldability was evaluated by vertical upward fillet welding using a steel plate defined by KE40, and mechanical properties were evaluated by a weld cracking test and a deposited metal test. In addition, for some experimentally manufactured wires, a welded joint test was performed by vertical upward welding using a K groove illustrated in FIG. 1 to perform a CTOD test. In this K groove, a groove angle was set to 45°, a groove depth on a surface side was set to 23 mm, and a groove depth on a back side was set to 35 mm. These welding conditions are indicated in Table 5.

TABLE 5

| test item | welding position | plate thickness (mm) | welding method | shielding gas | groove | current (A) | voltage (V) | welding speed (cm/min) |
|---|---|---|---|---|---|---|---|---|
| evaluation of welding weldability | vertical upward | 12 | semiautomatic MAG | Ar-20% CO$_2$ | T type fillet | 210 | 23 | about 10 |
| deposited metal test | flat | 20 | automatic MAG | 25 L/min | in conformity with JIS Z 3111 | 270 | 27 | 30 |
| weld cracking test | flat | 40 | automatic MAG | | in conformity with JIS Z 3158 | 250 | 26 | 40 |
| welded joint test (CTOD) | vertical upward | 60 | semiautomatic MAG | | FIG. 1 (K groove) | 190 to 220 | 21 to 25 | 19 to 23 |

Evaluation of welding weldability by vertical upward welding was performed by examining stability of an arc, occurring states of spatter and fume, a bead appearance/shape, dripping conditions of a molten metal, and presence of high-temperature cracking.

The weld cracking test was performed in conformity with a U shape weld cracking test method (JIS Z 3157) at a preheated temperature of a test body of 75° C. Presence of surface cracking or cross section cracking (five cross sections) of the test body 48 hours after welding was examined by penetrant testing (JIS Z 2343).

The deposited metal test was performed by welding in conformity with JIS Z 3111. Test pieces for a tensile test (No. A1) and an impact test (V notch test piece) were collected from a center part of a deposited metal in a plate thickness direction to perform a mechanical test. In evaluation of tensile strength, a test piece having tensile strength of 530 to 660 MPa was evaluated as being excellent. Evaluation of toughness was performed by a Charpy impact test at −40° C. Each test piece was subjected to a Charpy impact test repeatedly, and a test piece having an average of three absorption energies of 60 J or more was evaluated as being excellent.

In the welded joint test, a back side of the K groove illustrated in FIG. 1 was welded, and then the groove was subjected to back chipping of a radius of 6 mm and a groove angle of 45° from a steel plate surface to a depth of 34 mm, and a surface side was welded. For evaluation of a CTOD value by the welded joint test, a CTOD test piece was collected in conformity with BS (British standard) 7448, and three tests were performed repeatedly at a test temperature of −10° C. A test piece having a minimum CTOD value of 0.5 mm or more was evaluated as being excellent. Results thereof are indicated in Table 6 collectively.

TABLE 6

| category | wire symbol | examination result of welding weldability | result of U shape cracking test presence of cracking | Ts(MPa) | vE-40(J) | CTOD value −10° C. (mm) | total evaluation |
|---|---|---|---|---|---|---|---|
| Examples of the present invention | W1 | excellent | not observed | 600 | 78 | — | ○ |
| | W2 | excellent | not observed | 547 | 81 | 1.03 | ○ |
| | W3 | excellent | not observed | 573 | 94 | — | ○ |
| | W4 | excellent | not observed | 617 | 102 | — | ○ |
| | W5 | excellent | not observed | 594 | 91 | 0.94 | ○ |
| | W6 | excellent | not observed | 596 | 86 | — | ○ |
| | W7 | excellent | not observed | 573 | 83 | 0.67 | ○ |
| | W8 | excellent | not observed | 593 | 95 | — | ○ |
| | W9 | excellent | not observed | 580 | 93 | — | ○ |
| | W10 | excellent | not observed | 650 | 79 | 0.83 | ○ |
| | W11 | excellent | not observed | 576 | 76 | — | ○ |
| | W12 | excellent | not observed | 614 | 98 | 0.88 | ○ |
| | W13 | excellent | not observed | 562 | 94 | 0.72 | ○ |
| | W14 | excellent | not observed | 630 | 91 | — | ○ |
| | W15 | excellent | not observed | 618 | 72 | — | ○ |
| Comparative Examples | W16 | unstable arc | not observed | 487 | 51 | 0.21 | x |
| | W17 | rough arch, a large amount of spatter | observed | 705 | 48 | — | x |
| | W18 | poor bead appearance/shape | not observed | 538 | 54 | 0.33 | x |
| | W19 | poor slag removability | not observed | 596 | 42 | — | x |
| | W20 | poor slag encapsulation, metal dripping | not observed | 494 | 35 | 0.19 | x |
| | W21 | unstable arc, a large amount of spatter | observed | 698 | 49 | 0.25 | x |
| | W22 | excellent | not observed | 508 | 53 | — | x |
| | W23 | unstable arc, crater cracking, a large amount of spatter | not observed | 612 | 67 | — | x |
| | W24 | a large amount of spatter, a large amount of fume | not observed | 639 | 39 | 0.18 | x |
| | W25 | metal dripping | not observed | 545 | 46 | 0.22 | x |
| | W26 | poor bead appearance | not observed | 557 | 37 | 0.34 | x |
| | W27 | unstable arc, a large amount of spatter, poor bead shape, crater cracking | not observed | 614 | 52 | 0.17 | x |
| | W28 | excellent | observed | 669 | 38 | — | x |
| | W29 | unstable arc | not observed | 627 | 54 | — | x |
| | W30 | excellent | not observed | 636 | 49 | — | x |

Wire symbols W1 to W15 in Tables 1, 2, and 6 represent Examples of the present invention, and wire symbols W16 to W30 in Tables 3, 4, and 6 represent Comparative Examples. The wire symbols W1 to W15 as Examples of the present invention had compositions of components within a range defined in an embodiment of the present invention. Therefore, the wire symbols W1 to W15 had excellent welding weldability, no crack in a U type cracking test, and excellent tensile strength and an excellent absorption energy in a deposited metal test. That is, the wire symbols W1 to W15 obtained extremely satisfactory results. The wire symbols W3 to W5, W8, W9, and W12 to W14 containing a proper amount of Ni had an absorption energy of 90 J or more in the deposited metal test. The wire symbols W2, W5, W7, W10, W12, and W13 which had been subjected to a welded joint test obtained excellent CTOD values.

The wire symbol W16 in Comparative Examples included a small amount of C. Therefore, an arc was unstable and tensile strength of a deposited metal was low. In addition, the wire symbol W16 included a small amount in terms of Na and K in the fluorine compound, and therefore had a low absorption energy of the deposited metal. In addition, a CTOD value in the welded joint test was low.

The wire symbol W17 included a large amount of C, and therefore had high tensile strength of a deposited metal and a low absorption energy thereof. In addition, the total content in terms of Na and K in a fluorine compound was large. Therefore, an arc was rough, and the amount of spatter occurring was large. In addition, the wire symbol W17 had a seam in a steel outer skin and had high tensile strength of the deposited metal. Therefore, a crack was occurred in a weld in the U type cracking test.

The wire symbol W18 included a small amount of Si, and therefore had a poor bead appearance/shape. In addition, the wire symbol W18 included a small amount of Mg, and therefore had a low absorption energy of a deposited metal and a low CTOD value in the welded joint test.

The wire symbol W19 included a large amount of Si, and therefore had a low absorption energy of a deposited metal. In addition, the wire symbol W19 included a large amount in terms of $ZrO_2$, and therefore had poor slag removability.

The wire symbol W20 included a small amount of Mn, and therefore had low tensile strength of a deposited metal and a low absorption energy thereof. In addition, a CTOD value in the welded joint test was low. In addition, the wire symbol W20 included a large amount of $Na_2O$ and $K_2O$ in total. Therefore, slag removability was poor, and metal dripping occurred.

The wire symbol W21 included a large amount of Mn, and therefore had high tensile strength of a deposited metal and a low absorption energy thereof. In addition, a CTOD value in the welded joint test was low. In addition, the wire symbol W21 had a seam in a steel outer skin and high tensile strength of the deposited metal. Therefore, a crack was occurred in a welded part in the U type cracking test. In addition, the wire symbol W21 included a small amount of $Na_2O$ and $K_2O$ in total. Therefore, an arc was unstable, and the amount of spatter occurring was large.

The wire symbol W22 included a small amount of Cu, and therefore had low tensile strength of a deposited metal and a low absorption energy thereof. In addition, the wire symbol W22 included a small amount of Ni, and therefore did not improve an absorption energy of the deposited metal.

The wire symbol W23 included a large amount of Cu. Therefore, high-temperature cracking occurred in a crater part. In addition, the wire symbol W23 included a large amount of a fluorine compound in terms of F. Therefore, an arc was unstable, and the amount of spatter occurring was large.

The wire symbol W24 included a small amount of Ti, and therefore had a low absorption energy of a deposited metal and a low CTOD value thereof in the welded joint test. In addition, the wire symbol W24 included a large amount of Mg. Therefore, the amount of spatter occurring or fume occurring was large.

The wire symbol W25 included a large amount of Ti, and therefore had a low absorption energy of a deposited metal and a low CTOD value thereof in the welded joint test. In addition, the wire symbol W25 included a small amount in terms of $Al_2O_3$. Therefore, metal dripping occurred.

The wire symbol W26 included a small amount of B, and therefore had a low absorption energy of a deposited metal and a low CTOD value thereof in the welded joint test. The wire symbol W26 included a small amount in terms of $SiO_2$, and therefore had a poor bead appearance.

The wire symbol W27 included a large amount of B. Therefore, high-temperature cracking occurred in a crater part, and an absorption energy of a deposited metal was low. In addition, a CTOD value thereof in the welded joint test was low. In addition, the wire symbol W27 included a small amount in terms of $TiO_2$. Therefore, an arc was unstable, the amount of spatter occurring was large, and a bead shape was poor.

The wire symbol W28 included a large amount of Al, and therefore had a low absorption energy of a deposited metal. The wire symbol W28 included a large amount of Ni, and therefore had high tensile strength of the deposited metal. In addition, the wire symbol W28 had a seam in a steel outer skin and had high tensile strength of the deposited metal. Therefore, a crack was occurred in a weld in the U type cracking test.

The wire symbol W29 included a large amount in terms of $TiO_2$, and therefore had a low absorption energy of a deposited metal. In addition, the wire symbol W29 included a small amount of a fluorine compound in terms of F. Therefore, an arc was unstable.

The wire symbol W30 included a large amount in terms of $Al_2O_3$, and therefore had a low absorption energy of a deposited metal.

What is claimed is:

1. A flux-cored wire for Ar—$CO_2$ mixed gas shielded arc welding obtained by filling a flux into a steel outer skin, comprising, in terms of % by mass with respect to a total mass of the wire, as a total in the steel outer skin and the flux,
0.03 to 0.09% of C;
0.1 to 0.6% of Si;
1.3 to 2.6% of Mn;
0.01 to 0.5% of Cu;
0.05 to 0.5% of Ti;
0.002 to 0.015% of B;
more than 0%, to 0.05% of Al, and
0.1 to 0.5% of Ni,
and further comprising:
in terms of % by mass with respect to the total mass of the wire, in the flux,
5 to 9% of a Ti oxide in terms of $TiO_2$ in total;
0.1 to 0.6% of a Si oxide in terms of $SiO_2$ in total;
0.02 to 0.3% of an Al oxide in terms of $Al_2O_3$ in total;
0.1 to 0.8% of Mg;
0.05 to 0.3% of at least one fluorine compound in terms of F in total;

one or both of Na and K in the at least one fluorine compound, in an amount of 0.05 to 0.3% in terms of Na and K in total;

one or both of $Na_2O$ and $K_2O$, in an amount of 0.05 to 0.2% in terms of $Na_2O$ and $K_2O$ in total; and 0.1% or less of a Zr oxide in terms of $ZrO_2$ in total, the balance being Fe in the steel outer skin, iron powder, a Fe component of iron alloy powder, and inevitable impurities.

2. The flux-cored wire for Ar—$CO_2$ mixed gas shielded arc welding according to claim 1, wherein a seam in a molded steel outer skin is eliminated by welding a joint of the steel outer skin.

3. The flux-cored wire for Ar—$CO_2$ mixed gas shielded arc welding according to claim 1, wherein the flux-cored wire comprises, in terms of % by mass with respect to the total mass of the wire, as a total in the steel outer skin and the flux, 0.01 to 0.05% of Al.

4. The flux-cored wire for Ar—$CO_2$ mixed gas shielded arc welding according to claim 1, wherein the flux-cored wire comprises, in terms of % by mass with respect to the total mass of the wire, as a total in the steel outer skin and the flux, 1.72 to 2.6% of Mn.

* * * * *